(12) United States Patent
Paddick (10) Patent No.: US 12,474,536 B2
(45) Date of Patent: Nov. 18, 2025

(54) MULTI-PORT GLAND FOR AN OPTICAL CLOSURE

(71) Applicant: Prysmian S.p.A., Milan (IT)

(72) Inventor: Nathan Paddick, Milan (IT)

(73) Assignee: Prysmian S.p.A., Milan (IT)

( * ) Notice: Subject to any disclaimer, the term of this patent is extended or adjusted under 35 U.S.C. 154(b) by 522 days.

(21) Appl. No.: 17/848,961

(22) Filed: Jun. 24, 2022

(65) Prior Publication Data

US 2022/0413242 A1 Dec. 29, 2022

(30) Foreign Application Priority Data

Jun. 25, 2021 (IT) .......................... 102021000016676

(51) Int. Cl.
*G02B 6/00* (2006.01)
*G02B 6/44* (2006.01)

(52) U.S. Cl.
CPC ....... *G02B 6/44775* (2023.05); *G02B 6/4444* (2013.01); *G02B 6/44465* (2023.05); *G02B 6/4471* (2013.01)

(58) Field of Classification Search
CPC .............. G02B 6/4446; G02B 6/4444; G02B 6/44465; G02B 6/44775; G02B 6/00
See application file for complete search history.

(56) References Cited

U.S. PATENT DOCUMENTS

| 4,377,291 | A | 3/1983 | Albertini | |
|---|---|---|---|---|
| 8,050,528 | B2 * | 11/2011 | Shimirak | H02G 15/013 174/77 R |
| 9,696,511 | B2 * | 7/2017 | Michiels | G02B 6/44515 |
| 2008/0253730 | A1 | 10/2008 | Cox et al. | |

FOREIGN PATENT DOCUMENTS

EP 2 136 118 12/2009

OTHER PUBLICATIONS

Italian Search Report in corresponding Application No. 202100016676 dated Mar. 28, 2022.
Written Opinion in corresponding Application No. 202100016676 dated Jun. 25, 2021.

* cited by examiner

*Primary Examiner* — Jennifer Doan
(74) *Attorney, Agent, or Firm* — Haynes and Boone, LLP (57) ABSTRACT

A multi-port gland for an optical closure, the multi-port gland comprising a gland body configured to be attached to an optical closure, the gland body having gland channels extending along an insertion direction, each gland channel being configured for passage of an optical cable; one or more adapters, each adapter being configured to retain an optical cable and being configured to be inserted at least partially into a gland channel, each adapter comprising a seal body configured to seal the respective gland channel and to retain the optical cable passing through the gland channel, a seal closing element configured to cooperate with the seal body for sealing the gland channel and for retaining the optical cable passing through the gland channel.

16 Claims, 10 Drawing Sheets

MULTI-PORT GLAND FOR AN OPTICAL CLOSURE

FIELD OF THE INVENTION

The present invention relates to the field of equipment and components for the connection of optical cables to an optical closure.

BACKGROUND OF THE INVENTION

Typically, an optical closure comprises a base having a plurality of openings wherein a bunch of optical cables are inserted for splicing and/or to connect them to the network. In some cases, specific designed seals are used to retain optical cables to the openings. These solutions suffer of an uncorrected coupling between the openings and the seals other than the need of split to introduce a pre-connectorized cable. In other cases, complex and bulky cable box reducers are used to retain the optical cables in the optical closure openings. Such reducers hold a plurality of optical cables and usually comprise two coupling halves. The latter are able to retain the optical cables as well as pre-connectorized but comprise complex compression mechanism. Furthermore, in both cases the adding/removal of a cable from the optical closure causes the disassembly of the seal or the reducer extending the operation times.

U.S. Pat. No. 9,400,363 discloses a cable port size reducer adapted to be inserted into a cable port of a cable sealing unit for providing a reduced port size. The reducer has an insert body with a composite construction having a volume of sealant at least partially contained between first and second containment layers that form axial end caps of the insert body.

U.S. Pat. No. 5,775,702 A discloses an adaptor configured to be inserted within the port of the sealing device. An opening is provided in the adaptor for receiving the elongate object to be passed into the enclosure. The adaptor further includes a first compressing part and a second compressing part longitudinally offset from the first compressing part with a sealant disposed between the compressing part. Longitudinal movement of the compressing parts towards each other compresses the sealant into contact with an elongate object in the opening of the adaptor.

EP 2732323 discloses a sealing mechanism for a drop cable splice enclosure, the mechanism includes a base having an entry hole for receiving a drop cable inserted through a compression grommet assembly, from outside the enclosure. The cable can be prepared for splicing, outside the enclosure. The grommet assembly is inserted into the entry hole, from outside the enclosure. The assembly includes upper and lower pressure plates, a compressible grommet between them, and an adjustment mechanism to apply a compression force to the grommet. The grommet assembly is rotatable to lock it in a keyed section in the entry hole. The adjustment mechanism is then tightened, from outside the enclosure, to compress the grommet between the pressure plates, which seals the grommet in the enclosure base, at the same time sealing the cable in the passageway through the grommet.

US 20170010431 discloses an enclosure including a housing and a sealing unit that fits within a sealing unit opening of the housing. The sealing unit provides a seal around cable ports and provides a peripheral seal between the housing and the sealing unit. The sealing unit can include a sealant arrangement and an actuation arrangement for pressurizing the sealant arrangement within the sealing unit opening. The actuation arrangement can include inner and outer pressurization structures between which the sealant arrangement is positioned. The actuation arrangement includes first and second actuators each movable between a non-actuated position and an actuated position. When the first and second actuators are moved towards the actuated positions, the first and second actuators generate first and second seal pressurization forces that press the sealant arrangement between the first and second pressurization structures, and the first and second seal pressurization forces are transferred through respective first and second springs.

SUMMARY OF THE INVENTION

The applicant has tackled the problem of providing a multi-port gland for an optical closure to insert/extract optical cables into/from an optical closure in a simple and fast way avoiding relevant operation time.

The Applicant has found that a gland body with one or more gland channels, in which is insertable an adapter configured to retain a respective optical cable, improves coupling and retaining of a cable to the optical closure.

Therefore, the present invention provides a multi-port gland as disclosed herein.

According to one embodiment, each seal body has an outer surface and comprises a seal channel configured to receive at least one optical cable and a slit extending from the outer surface to the seal channel and configured to guide insertion of the optical cable into the seal channel.

According to one embodiment, the adapter comprises an adapter body having an adapter channel extending between a first adapter opening and a second adapter opening along the insertion direction and configured to receive the optical cable, the seal closing element is coupled with the adapter body at the first adapter opening, the seal body is arranged into the adapter channel and is configured to cooperate with the seal closing element for sealing the adapter channel at the first adapter opening and for retaining the optical cable received in the adapter body.

According to one embodiment, each adapter comprises an adapter locking arrangement configured to mutually and reversibly lock the adapter body and the seal closing element along the insertion direction.

According to one embodiment, the adapter locking arrangement comprises one or more first adapter locking elements associated to the adapter body proximate to the first adapter opening, one or more second adapter locking elements and a third adapter locking element associated to the seal closing elements and configured to cooperate with the first adapter locking elements to lock the seal closing element with respect the adapter body along the insertion direction.

According to one embodiment, the first adapter locking elements comprise adapter seats, the second adapter locking elements comprise deformable adapter protrusions configured to engage and fit in the adapter seats upon insertion of the seal closing element into the adapter channel, the third adapter locking element comprises an adapter protrusion configured to abut against the adapter body at the first adapter opening upon engagement between the first adapter locking elements and the second adapter locking element.

According to one embodiment, the multi-port gland comprises a gland locking arrangement configured to mutually and reversibly lock each adapter to the respective gland channel along the insertion direction, each gland channel extending between a first gland opening and a second gland opening along the insertion direction.

According to one embodiment, the gland locking arrangement comprises one or more first gland locking elements associated to the gland body proximate to the second gland opening, one or more second gland locking elements and a third gland locking element associated to the adapter body and configured to cooperate with the first gland locking elements to lock each adapter body with respect the gland body along the insertion direction.

According to one embodiment, the first gland locking elements comprise gland seats, the second gland locking elements comprise deformable gland protrusions configured to engage the gland seats at the second gland opening upon insertion of the adapter into the gland channel, the third gland locking element comprises gland protrusion configured to abut against the gland body at the first gland opening upon engagement between the first gland locking elements and the second gland locking element.

According to one embodiment, at least a portion of the adapter body is shaped as the respective gland channel.

According to one embodiment, each seal body comprises a first seal portion and a second seal portion extending from the first seal portion along the insertion direction and defining with the first seal portion the seal channel, the second seal portion being configured to be inserted into the gland channel and engaging the inner surface of the gland channel by interference fit, the first seal portion abutting against the gland body upon insertion of the second seal portion into the gland channel.

According to one embodiment, the seal closing element is coupled with the first seal portion, the seal closing element being configured to cooperate with the gland body for sealing the gland channel and for retaining the optical cable received in the gland channel.

According to one embodiment, the gland body comprises a lateral wall extending between a first gland end portion and second gland end portion along the insertion direction and an inner wall projecting from an inner gland surface of the lateral wall, the lateral wall having an outer gland surface configured to engage the optical closure.

According to one embodiment, the inner wall and the lateral wall defines the insertion direction of the gland channels.

According to one embodiment, the lateral wall defines a passing through channel which the inner wall divides into the gland channels.

The present invention further relates to a multi-port gland assembly comprising an optical closure comprising a base having one or more insertion channels extending along an insertion direction between first insertion openings and second insertion openings, one or more port glands, each multi-port gland being arranged in a respective insertion channel, one or more optical cables associated to the adapters arranged into the gland channels of the multi-port glands.

According to one embodiment, an anti-rotation arrangement configured to prevent mutual rotation about a longitudinal axis extending along the insertion direction of the gland body relative to the optical closure, an axial locking arrangement to prevent mutual motion along the longitudinal axis of relative to the optical closure.

According to one embodiment, the anti-rotation arrangement comprises first anti-rotation elements associated to the gland body, second anti-rotation elements associated to the insertion channels proximate to the first insertion openings.

According to one embodiment, the first anti-rotation elements comprise protruding pins formed externally on each gland body, the second anti-rotation elements comprise slots formed internally in each insertion channel and configured to receive and retain the protruding pins upon insertion of the gland body into the insertion channel, thereby preventing mutual rotation of the gland body relative to the insertion channel about the longitudinal axis.

According to one embodiment, the axial locking arrangement comprises first axial locking elements associated to the gland body, second axial locking elements associated to the insertion channel proximate to the second insertion opening.

According to one embodiment, the first axial locking elements comprise elastic deformable wings formed externally on each gland body, the second anti-torsion elements comprise seats formed proximate to the second insertion opening of each insertion channel and configured to receive and retain the elastic deformable wings upon insertion of the gland body into the insertion channel, thereby preventing axial motion of the gland body relative to the insertion channel along the longitudinal axis.

According to one embodiment, each insertion channel comprises at the second insertion opening an engaging edge configured to engage a portion of the gland body.

According to one embodiment, each insertion channel has an inner surface configured to engage with a multi-port gland.

According to one embodiment, the gland body has an extension along the insertion direction greater than the extension of the insertion channel so that a portion of gland body extends beyond the second gland opening, thereby the first axial locking element being configured to engage the second axial locking element at the second insertion openings.

BRIEF DESCRIPTION OF THE DRAWINGS

The present invention will now be described in more detail hereinafter with reference to the accompanying drawings, in which some embodiments of the invention are shown.

DETAILED DESCRIPTION

Figure 1:
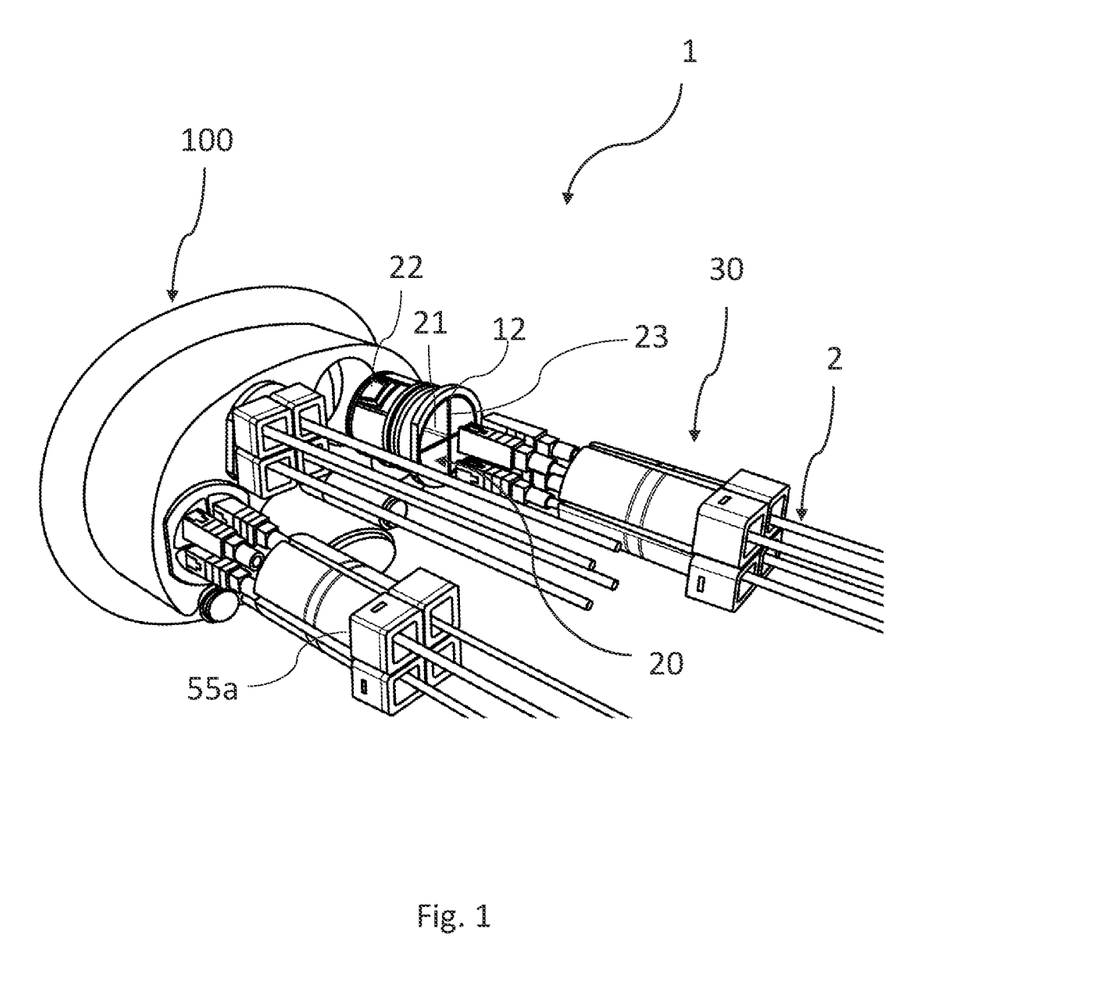
FIG. 1 is a perspective view of a multi-port gland for an optical closure according to one embodiment of the present invention.

FIG. 1 shows a multi-port gland 1 for an optical closure 100 for connecting one or more optical cables 2 to the optical closure 100.

For the purpose of the present invention, the optical cable 2 can be both a pre-connectorized optical cable or a ready for splicing optical cable. The optical cable 2 has an insertion head 2a configured to be arranged inside the optical closure 100 and a retaining portion 2b extending from the insertion head 2a along the development of the optical cable. The multi-port gland 1 is configured to retain the retaining portion 2b of the optical cable in order to hold the insertion head 2a into the optical closure 100.

The multi-port gland 1 comprises a gland body 10 configured to be attached to an optical closure 100. In particular, the gland body 10 is configured to be inserted in a standard opening commonly present on the base of the optical closure for the passage of a cable. The gland body 10 has gland channels 20 extending along an insertion direction X-X. Each gland channel 20 is configured for passage of an optical cable 2. Each gland channel 20 extends between a first gland opening 21 and a second gland opening 22 along the insertion direction X-X. The first gland opening 21 is configured to receive the optical cable 2 during the insertion of the optical cable 2 into the gland channel 20, while the second gland opening 22 is configured to receive the optical cable 2 when the optical cable 2 passes over the gland channel 20.

The gland body 10 comprises a lateral wall 11 extending between a first gland end portion and second gland end portion 11b along the insertion direction X-X and an inner wall 12 projecting from an inner gland surface of the lateral wall 11. It is to be noted that the lateral wall 11 has an outer gland surface 13 configured to engage the optical closure 100, as described below. The inner wall 12 and the lateral wall 11 define along the insertion direction X-X the gland channels 20 and the relative first gland openings 21 and the second gland openings 22 at the first gland end portion 11a, and the second gland end portion 11b. Specifically, the lateral wall 11 defines a passing through channel which the inner wall 12 divides into the gland channels 20. Furthermore, it is to be noted that the inner wall 12 and lateral wall 11 define a first gland abutment edge 23 at the first gland openings 21 and a second gland abutment edge 24 at the second gland openings 21.

According to one embodiment, shown in the figures, the lateral wall 11 has a cylindrical shape. Thanks to this shape, the gland body can be easily arranged into standard openings formed on the optical closures 100 having a circular footprint. The inner wall 12 divides the passing through channel, which is substantially a hollow cylinder, into the gland channels 20 having a circular sector cross section. In order to optimize the number of singular optical cables 2 insertable into a respective gland body 10, the inner wall 12 divides the passing through channel in four gland channels 20 having a circular sector cross section with a centre angle of approximatively 90°.

The lateral wall 11 and the inner wall 12 can define gland channels 20 having different shaped cross section such as circular or polygonal.

According to one embodiment, the gland body 10 associated to each gland channel 20 at the second gland opening 21 can comprise a stopping piece. The latter is configured to plug each gland channel 20 when no optical cable 2 has been inserted. Such stopping piece can be of breakable type.

The multi-port gland 1 comprises one or more adapters 30. Each adapter 30 is configured to retain an optical cable 2 and to be inserted at least partially into a gland channel 20. Specifically, each adapter 30 is configured to be inserted into a gland channel 20 passing through the relative first gland opening 21.

Each adapter 30 comprises a seal body 40 configured to seal the respective gland channel 20 and to retain the optical cable 2 passing through the gland channel 20. Such seal body 40 can be made of rubber, gel, and/or other material able to seal.

Figure 7:
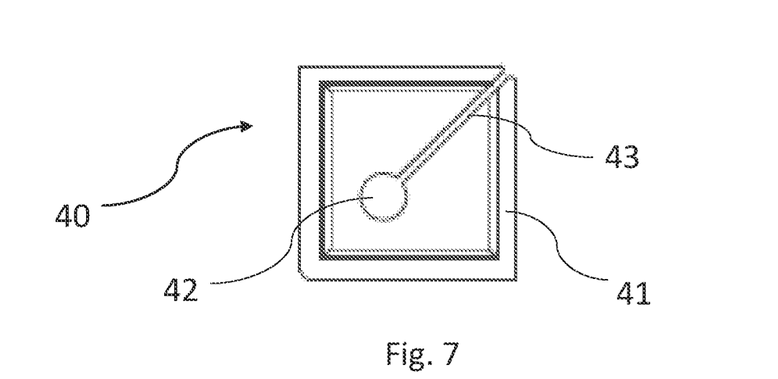
FIG. 7 is a bottom view of a seal body of the multi-port gland of FIG. 1.
Figures 8, 9:
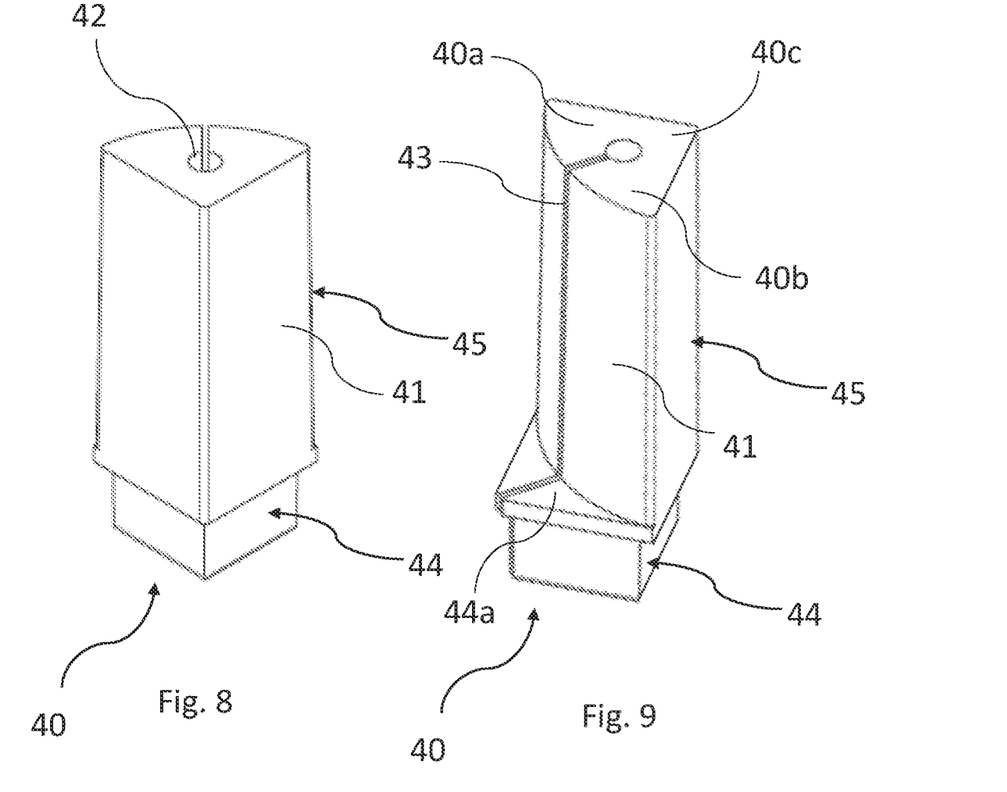
FIG. 8 is a front view of the seal body of FIG. 6.
FIG. 9 is a perspective view of the seal body of FIG. 6.
Figure 10:
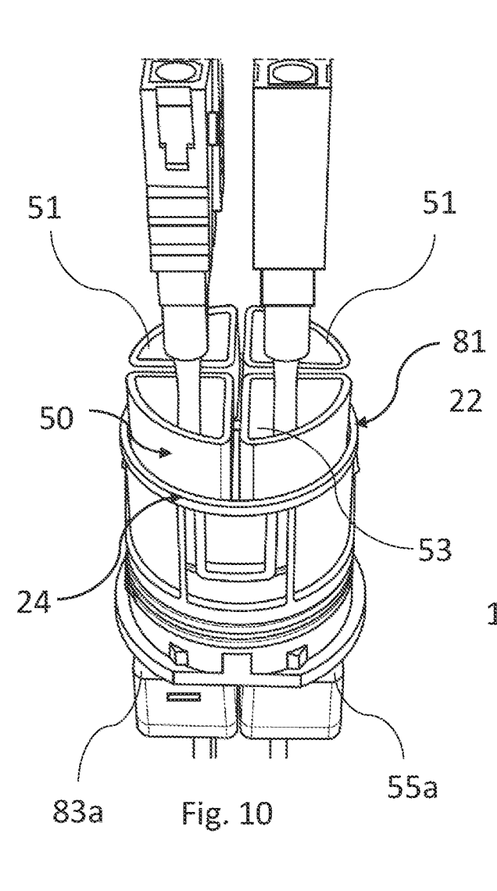
FIG. 10 is perspective view of the multi-port gland of FIG. 1 assembled.
Figure 11:
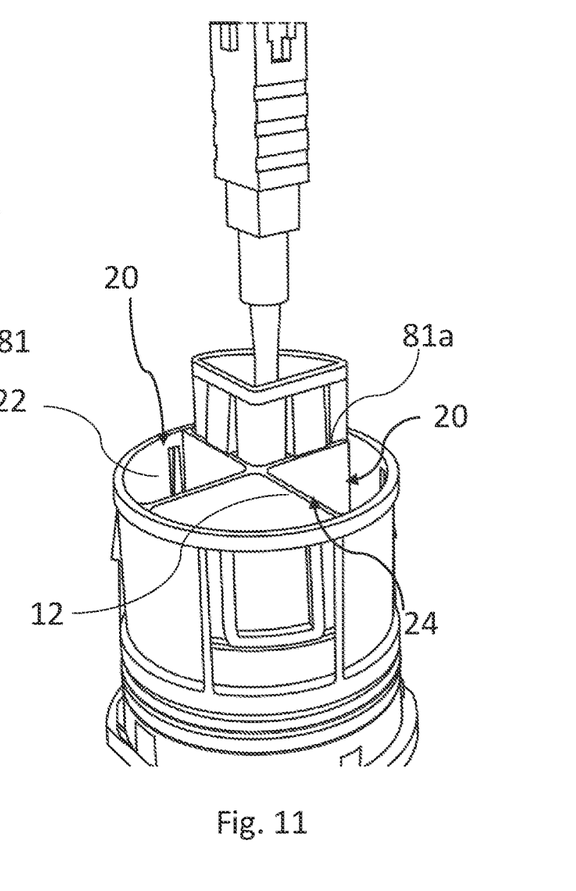
FIG. 11 is perspective view of the multi-port gland of FIG. 1 partially assembled
Figure 12:
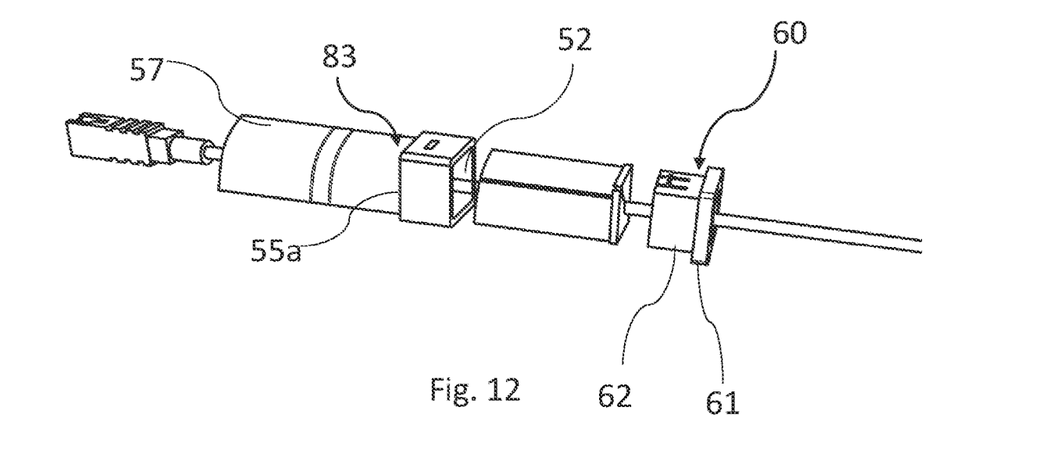
FIG. 12 is perspective view of the multi-port gland of FIG. 1 disassembled.

According to one embodiment, each seal body 40 has an outer surface 41. Each seal body 40 comprises a seal channel 42 configured to receive at least one optical cable 2. The seal channel 42 extends for the whole extension of the relative seal body 40. Each seal body 40 further comprises a slit 43 which extends from the outer surface 41 to the seal channel 42 and is configured to guide insertion of the optical cable 2 into the seal channel 42. Namely, the slit 43 extends as well as the seal channel 42 and defines two seal portions 40a, 40b and a hinge seal portion 40c with respect to which the two seal portions 40a, 40b can be spaced apart for the insertion of the optical cable 2. Two seal portions 40a, 40b are portions of the seal body 40 extending between the sides of the slit 42 and the hinge seal portion 40c.

The seal body 40 comprises a first seal portion 44 and a second seal portion 45 extending from the first seal portion 44 along the insertion direction X-X. The first seal portion 44 and the second seal portion 45 defines the seal channel 41.

According to a preferred embodiment shown in FIGS. 1-11, each adapter 30 comprises an adapter body 50 having an adapter channel 51 extending between a first adapter opening 52 and a second adapter opening 53 along the insertion direction X-X and configured to receive the optical cable 2.

The adapter body 50 comprises first adapter portion 55 and a second adapter portion 56 extending from the first adapter portion 55 along the insertion direction X-X and defining with the first adapter portion 55 the adapter channel 51. The second adapter portion 56 is configured to be arranged at least in part into the gland channel 20 upon insertion of the second adapter portion 56 into gland channel 20. Specifically, the second adapter portion 56 is configured to engage the gland body 20 at the second gland opening 22. In detail, the adapter body 50 has an outer adapter surface 57 configured to engage at least in part the gland channel 20.

According to one aspect of the present invention, at least a portion of the adapter body 50 is shaped as the respective gland channel 20. Specifically, the second adapter portion 56 is shaped as the gland channel 20. Namely, as shown in FIG. 1, the second adapter portion 56 has a cross section shaped as a circular sector. Thanks to this cross section shape, it is also possible to prevent mutual rotation of the adapter body 50 with respect to the gland body 20, upon insertion of the adapter body 50 into the gland channel 20. The first adapter portion 55 is configured to abut against the gland body 20 at the first gland opening 21 and then to be maintained outside the gland channel 20. In particular, the first adapter portion 55 comprises an abutting adapter surface 55a spaced apart from the first adapter opening 52 and configured to abut against the gland body 20 upon insertion of the adapter body 50 into the gland channel 20.

Figure 5:
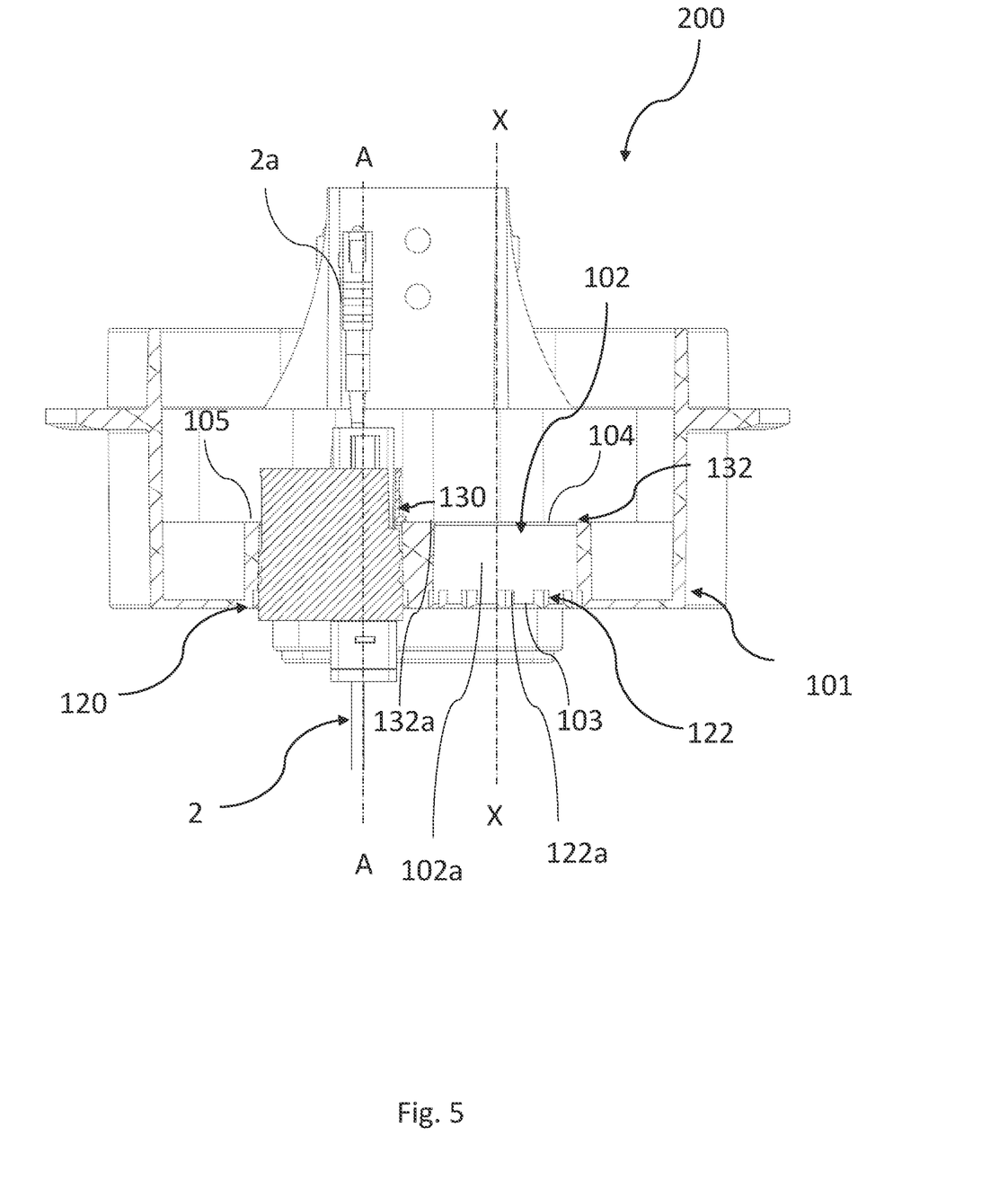
FIG. 5 is a section view of the multi-port gland of FIG. 1 in a further step for assembling the multi-port gland into an optical closure.
Figure 6:
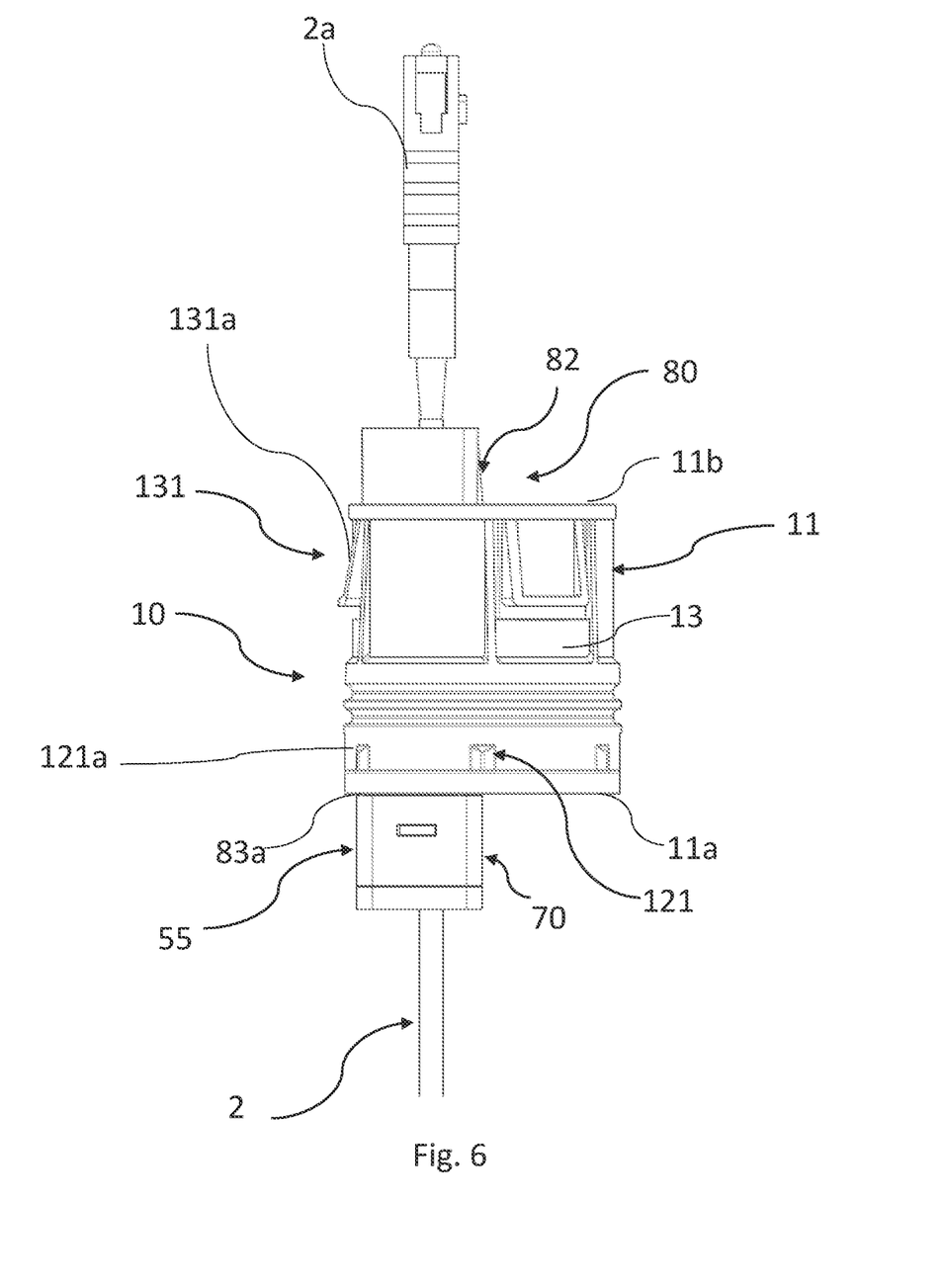
FIG. 6 is a lateral view of the assembled multi-port gland of FIG. 1.

According to one embodiment, the adapter body 50 has an extension along the insertion direction X-X greater than the extension of the gland channel 20, so that a portion of the second adapter portion 56 extends beyond the second gland opening 22, as shown in FIG. 5, upon insertion of the adapter body 50 into the gland channel 20. In this way, the second adapter portion 56 can engage the second gland abutment edge 24 at the second gland opening 22.

The adapter 30 comprises a seal closing element 60 configured to cooperate with the seal body 40 for sealing the gland channel 20 and for retaining the optical cable 2 passing through the gland channel 20. Specifically, the seal closing element 60 prevents the seal body 40 from moving along the insertion direction X-X.

The seal closing element 60 according to the embodiment shown in FIGS. 1-12 is coupled with the adapter body 50 at the first adapter opening 52.

According to one embodiment, the seal closing element 60 comprises an annular base 61 and an insertion wall 62 extending from the annular base 62. The insertion wall 62 is configured to be inserted into the adapter channel 51 at the first adapter opening 52. The annular base 61 and the insertion wall 62 define a closing element channel configured to receive at least one optical cable 2. Specifically, the first adapter portion 55 is configured to be coupled with the seal closing element 60. In detail, the first adapter portion 55 and the seal closing element 60 have the same cross section shape so as the seal closing element 60 can be inserted into the adapter channel 51 at first adapter portion 55. According to the preferred embodiment, the first adapter portion 55 and the seal closing element 60 have a polygonal cross section, namely with four sides.

According to the present embodiment, the seal body 40 is arranged into the adapter channel 51 and is configured to cooperate with the seal closing element 60 for sealing the adapter channel 51 at the first adapter opening 52 and for retaining the optical cable 2 received in the adapter body 50. Specifically, the second seal portion 45 is configured to be inserted into the second adapter portion 56. According to one aspect of the present embodiment, the second seal portion 45 is shaped as the second adapter portion 56 and as the gland channel 20. Namely, the second seal portion 45 has a cross section shaped as a circular sector.

The first seal portion 44 is configured to be inserted into the first adapter portion 55 abutting internally with the first adapter portion 55, preventing the sliding of the seal body along the insertion direction towards the second gland opening 22. Specifically, the first seal portion 44 abuts internally with the abutting adapter surface 55a, through an abutting seal surface 44a. In detail, the first seal portion 44, the first adapter portion 55 and the seal closing element 60 have the same cross section shape so as the seal closing element 60 can be inserted into the adapter channel 41 at first adapter portion 55 and the first seal portion 44 can be inserted into the first adapter portion 55. According to the preferred embodiment, the first seal portion 44, the first adapter portion 55, the seal closing element 60 have a polygonal shape cross section, namely with four sides.

The first seal portion 44 and the first adapter portion 55 define therebetween an insertion groove configured to receive by interference fit the seal closing element 60, in particular the insertion wall 62.

Accordingly, the outer seal surface 41 at the second seal portion 45 is configured to engage by interference fit with the inner surface of the adapter channel 51. The outer seal surface 41 at the first seal portion 44 is configured to engage by interference fit with an inner surface of the seal closing element 60, namely the inner surface of the closing element.

According to one embodiment, each adapter 30 comprises an adapter locking arrangement 70 configured to mutually and reversibly lock the adapter body 50 and the seal closing element 60 along the insertion direction X-X.

The adapter locking arrangement 70 comprises first adapter locking elements 71 associated to the adapter body 50 proximate to the first adapter opening 51. The adapter locking arrangement 70 further comprises second adapter locking elements 72 and a third adapter locking element 73 associated to the seal closing elements 60.

The second adapter locking element 72 and the third adapter locking element 73 are configured to cooperate with the first adapter locking elements 71 to lock the seal closing element 60 with respect the adapter body 50 along the insertion direction X-X.

According to one embodiment, the first adapter locking elements 71 comprise adapter seats 71a. The adapter seats 71a are formed on the first adapter portion 55 of the adapter body 50. The second adapter locking elements 72 comprise deformable adapter protrusions 72a configured to engage and fit in the adapter seats 71a upon insertion of the seal closing element 60 into the adapter channel 51. Namely, each deformable adapter protrusion 72a, formed on the insertion portion 62 and protruding from the relative outer surface, is elastically deformable along a direction transversal to the insertion direction X-X for engaging the relative adapter seat 71a. In detail, during the insertion of the seal closing element 60 into the adapter channel 51, each deformable adapter protrusion 72a deforms inwardly towards the centre of the channel, and upon reached the relative adapter seat 11a deforms outwardly engaging the adapter seat 71a.

It is to be noted that the first adapter locking elements 71 and the second adapter locking elements 72 are spaced apart respectively on the first adapter portion 55 and the insertion wall 62. The first adapter locking elements 71 and the then the second adapter locking elements 72 can be formed on the centre of a relative side of the first adapter portion 55 and the insertion wall 62.

In detail, the first adapter locking elements 71 and the second adapter locking element 72 defines a snap-fit engagement.

Finally, the third adapter locking element 73 comprises an adapter protrusion 73a configured to abut against the adapter body 50 at the first adapter opening 52 upon engagement between the first adapter locking elements 71 and the second adapter locking element 72. The adapter protrusion 73a projects outwardly from the base 61 of the seal closing element 60 with respect to the closing element channel in the form of a flange.

According to one embodiment, the multi-port gland 1 comprises a gland locking arrangement 80 configured to mutually and reversibly lock each adapter 30 to the respective gland channel 20 along the insertion direction X-X.

The gland locking arrangement 80 comprises a first gland locking elements 81 associated to the gland body 10 proximate to the second gland opening 21. The gland locking arrangement 80 further comprises second gland locking elements 82 and a third gland locking element 83 associated to the adapter body 50.

The second gland locking elements 82 and the third gland locking element 83 are configured to cooperate with the first gland locking elements 81 to lock each adapter body 50 with respect the gland body 10 along the insertion direction X-X.

According to one embodiment, the first gland locking elements 81 comprise gland seats 81a. The gland seats 81a are formed on the gland body 20 at the second gland opening 21. Specifically, the second gland abutment edges 24 defines the gland seats 81a. The second gland locking elements 82 comprise deformable gland protrusions 82a configured to engage the gland seats 81a at the second gland opening 22 upon insertion of the adapter 40 into the gland channel 20. According to a preferred embodiment, the second gland locking elements 82 are formed on the outer adapter surface 57 proximate to the second adapter opening 53.

Namely, each deformable gland protrusion 82a, formed on the second adapter portion 56 proximate to the second adapter opening 53 and protruding from the relative outer surface, is elastically deformable along a direction transversal to the insertion direction X-X for engaging the relative gland seat 81a. In detail, during the insertion of the adapter body 50 into the gland channel 20, each deformable gland protrusion 82a deforms inwardly toward the centre of the channel and, upon engagement, the relative gland seat 81a deforms outwardly engaging the adapter seat 81a. In the present case, the gland seats 81a are reached when the portion of second adapter portion 56 extends totally beyond the second gland opening 52.

In detail, the first gland locking elements 81 and the second gland locking element 82 defines snap-fit engagement.

The third gland locking element 83 comprises gland protrusion 83a configured to abut against the gland body 50 at the first gland opening 21 upon engagement between the first gland locking elements 81 and the second gland locking elements 82. It is to be noted that the abutting adapter surface 55a defines the third gland locking element 83 and the gland protrusion 83a.

Figure 2:
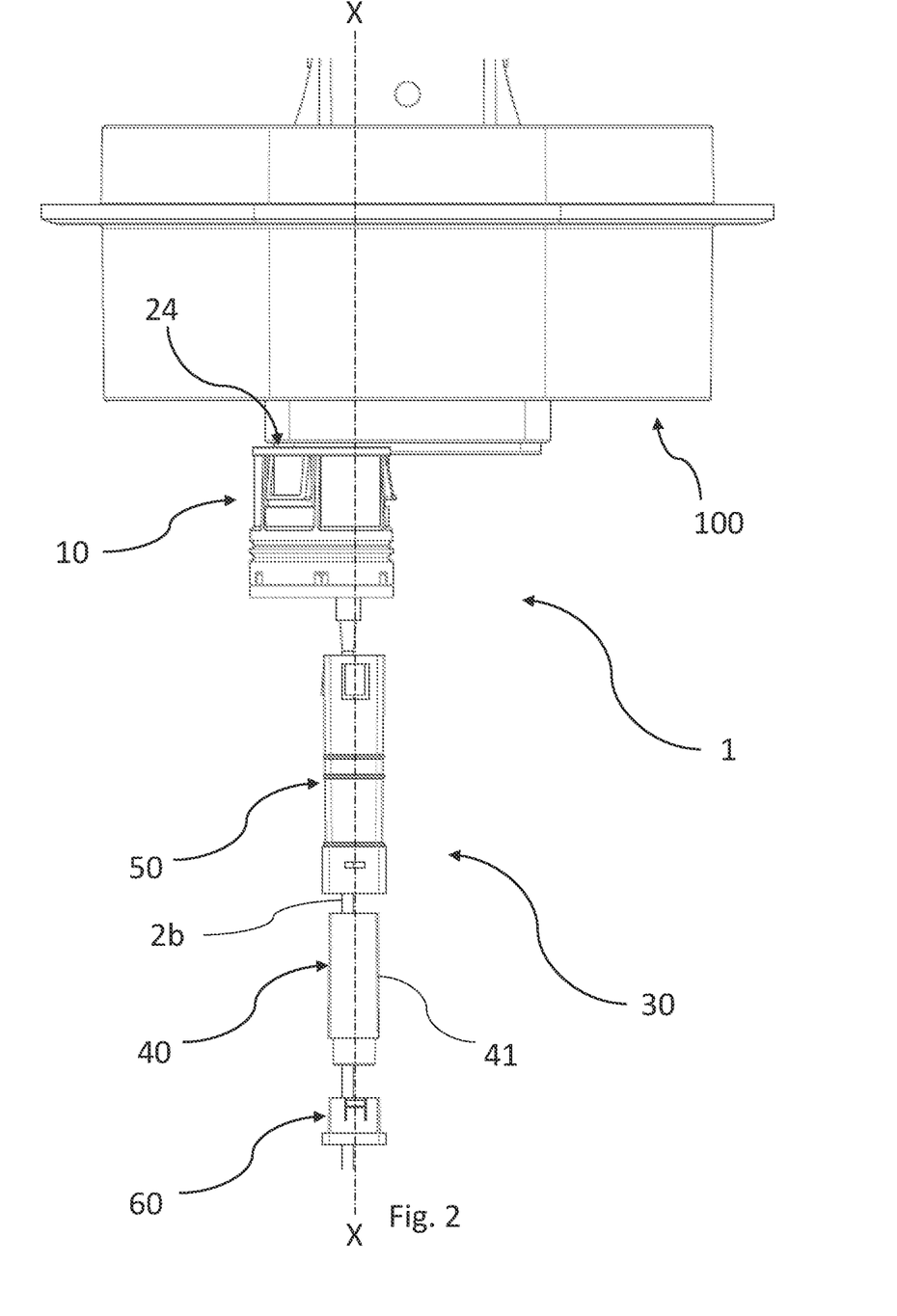
FIGS. 2, 3 and 4 are lateral views of the multi-port gland of FIG. 1 in successive steps for assembling the multi-port gland into an optical closure.
Figure 3:
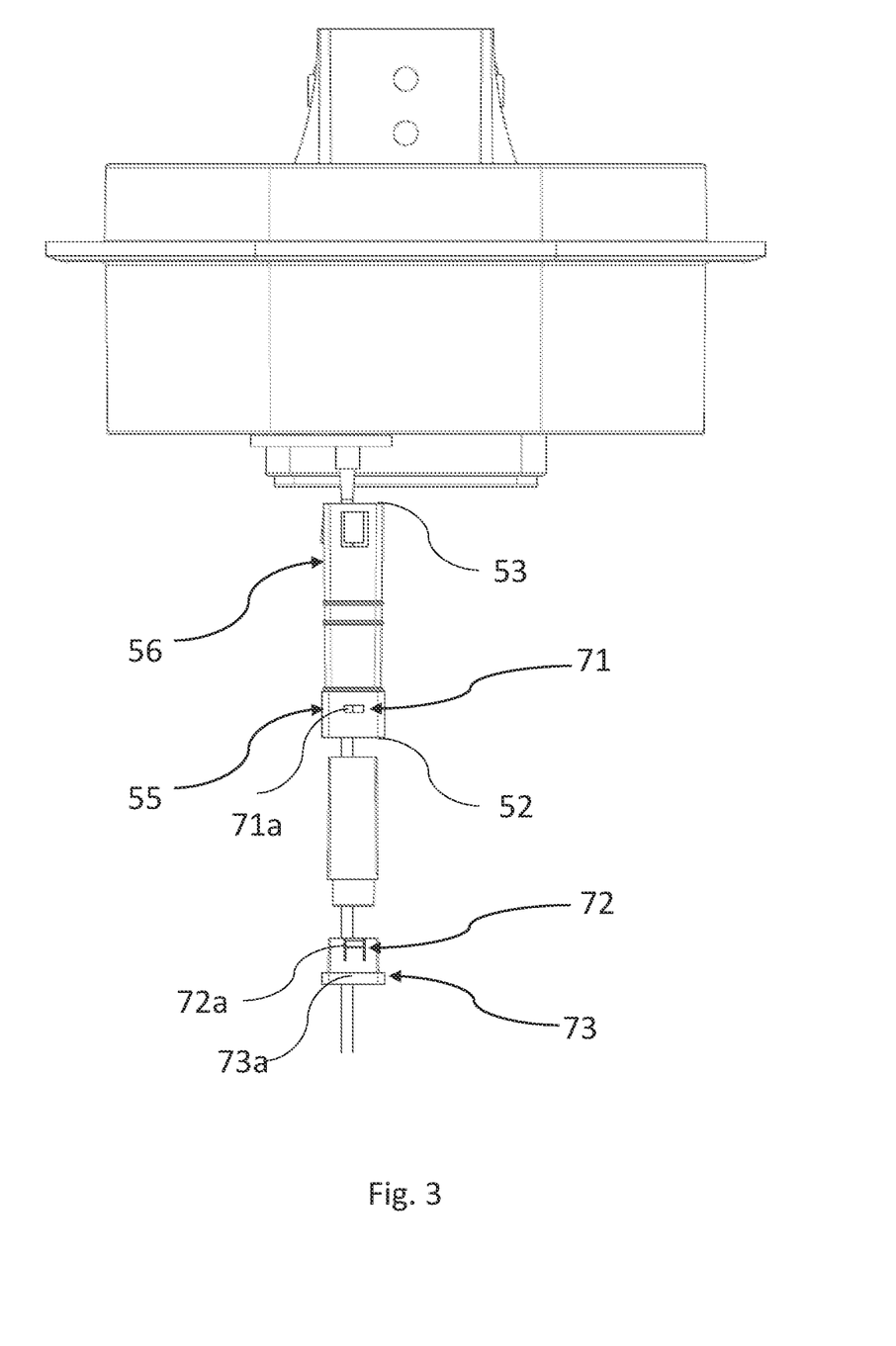
Figure 4:
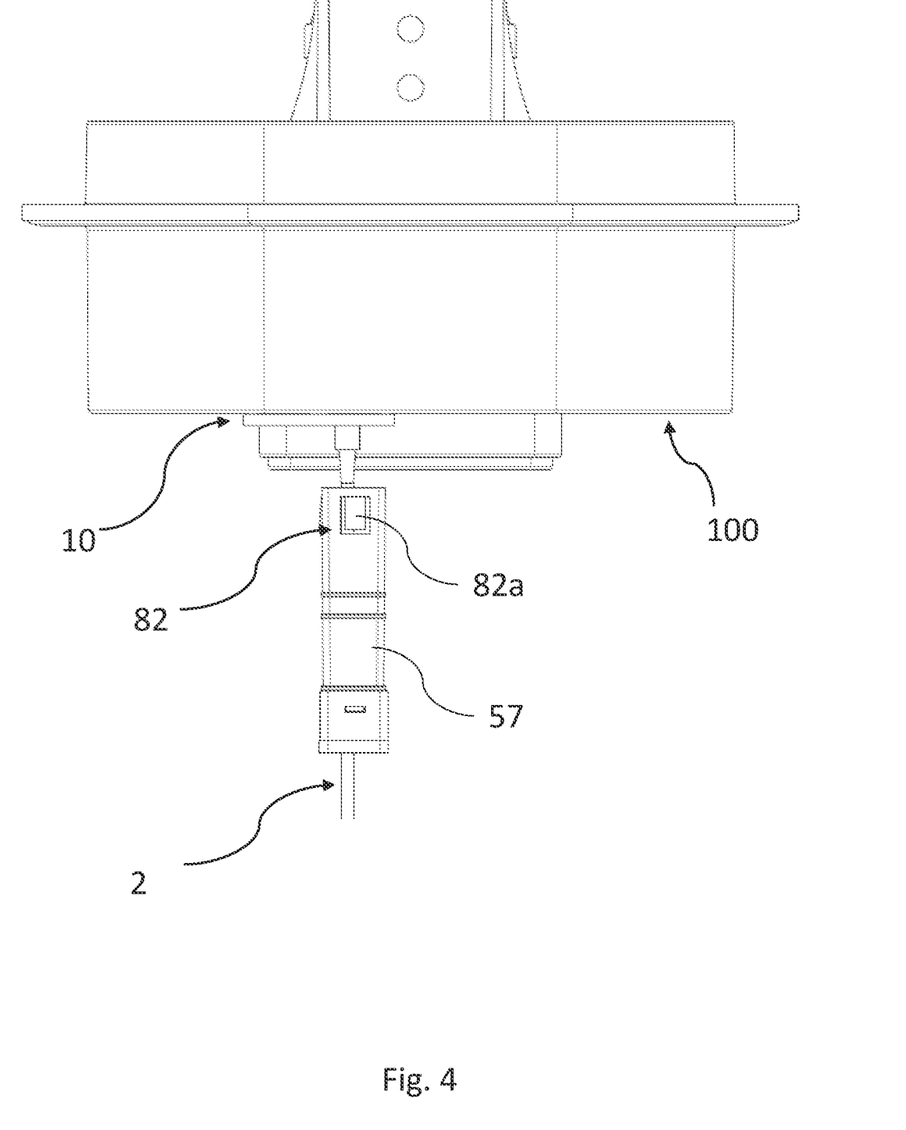

According to the present embodiment, the cable 2 is firstly inserted into the seal closing element 60 and secondly into the adapter body 50 (FIG. 2). The seal body 40 engages the cable 2 between the seal closing element 60 and the adapter body 50 (FIG. 3). Upon adjustment of the extension of the cable 2 into the optical closure 100, the seal body 40 is pushed inside the adapter body 50 and then locked with the seal closing element 60 (FIG. 4). Thanks to the mutual coupling among the adapter body 50, the seal closing element 60 and the seal body 40, the adapter channel 51 is sealed and the optical cable 2 is retained to the adapter body 50. Subsequently, the adapter 30 is inserted into one of the gland channels 20 upon the mutual engagement (FIG. 5). The gland body 10 can be inserted into the optical closure 100 before the mutual engagement with one of the adapters 30 (FIG. 4) or after the mutual engagement with the adapter 30.

Figure 13:
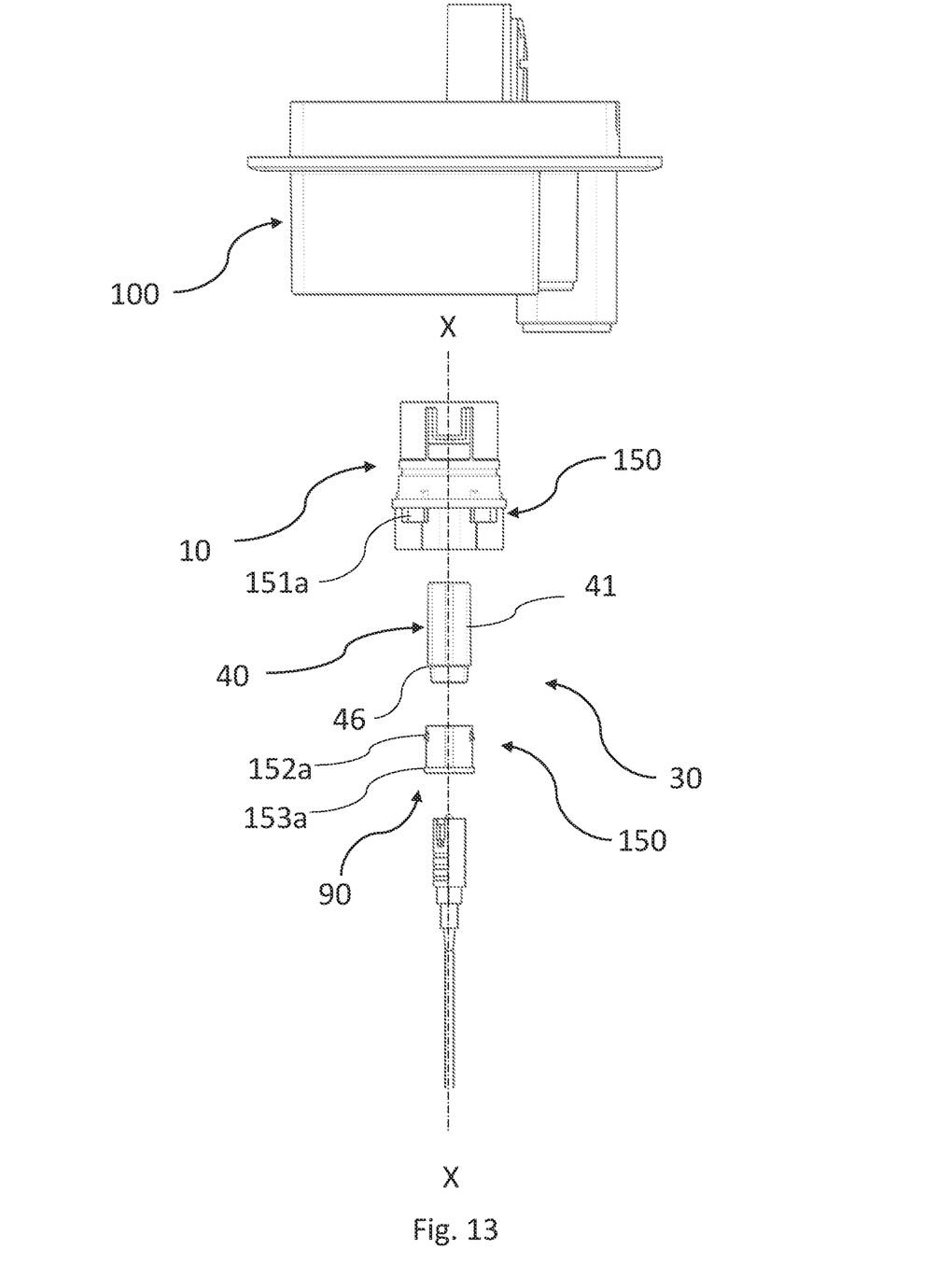
FIG. 13 is a lateral view of a multi-port gland for an optical closure according to a further embodiment of the present invention.
Figure 14:
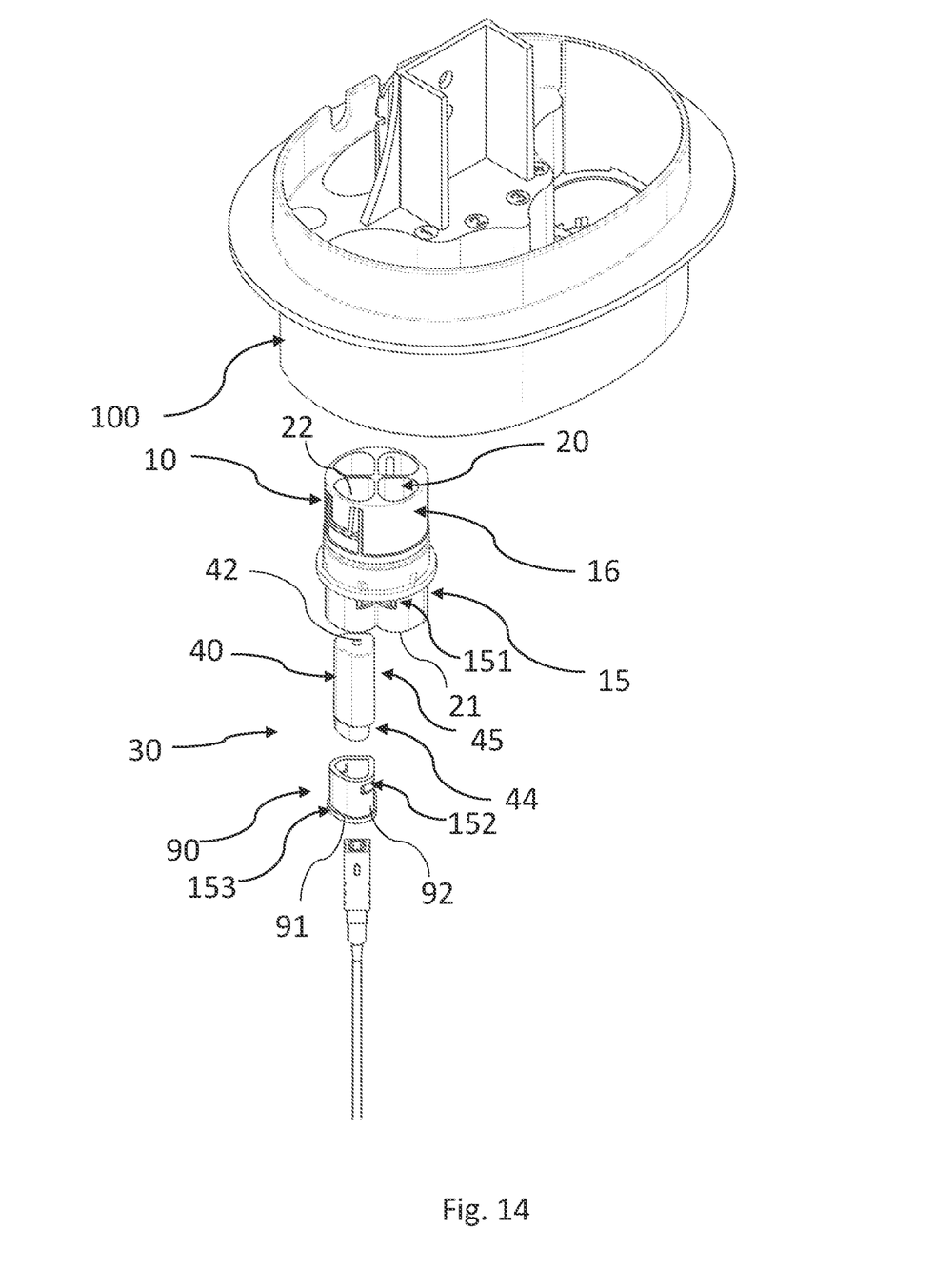
FIG. 14 is a perspective view of the multi-port gland of FIG. 13.

According to an alternative embodiment shown in FIGS. 13 and 14, at least a portion of the seal body 40 is configured to be inserted directly into a gland channel 20. Specifically, the second seal portion 45 is configured to be inserted into the gland channel 20 engaging the inner surface of the gland channel 20 by interference fit. The first seal portion 44 and the second seal portion 45 are shaped as the gland channel 20.

In the embodiment shown in FIGS. 13, 14 each gland channel 20 has a petal shape cross section as well as the seal body 40. In the present embodiment, the first seal portion 44 and the second seal portion 45 are arranged into the gland channel 20, such that the first seal portion 44 is proximate to the relative first gland opening 21 and the second seal portion 45 is faced towards the second gland opening 22. It is to be noted that the first seal portion 44 has a cross section smaller than the cross section of the second seal portion 45. Namely, the second seal portion 45 defines a flange 46 abutting along a direction perpendicular to the insertion direction X-X.

According to the embodiment shown in FIGS. 13 and 14, each gland channel 20 has a first gland portion 15 and a second gland portion 16 extending from the first gland portion 15 along the insertion direction X-X and defining with the first adapter portion the relative gland channel 20. The seal body 40 of the present embodiment is configured to be inserted into a gland channel 20 such that the second seal portion 45, arranged in the second gland portion 16, is coupled with the second gland portion 16 by interference fit and the first seal portion 44 is arranged inside the first gland portion 15.

The multi-port gland 1 comprises a seal closing element 90 configured to cooperate with the seal body 40 for sealing the gland channel 20 and for retaining the optical cable 2 passing through the gland channel 20. Specifically, the seal closing element 90 prevents the seal body 40 from moving along the insertion direction X-X.

The seal closing element 90 according to the embodiment shown in FIGS. 13 and 14 is coupled with the first seal portion 44. Specifically, the seal closing element 90 is coupled with the gland body 10.

The seal closing element 90 is configured to cooperate with the seal body 40 for sealing the gland channel 20 and for retaining the optical cable 2 received in the gland channel 20. Namely, the seal closing element 90 in configured to be inserted into the gland channel 20.

According to this embodiment, each seal closing element 90 is coupled with the gland body 10 at the first gland opening 21 upon insertion of the seal closing element 90 into a relative channel 20. Each closing element 90 has substantially the same technical features of the seal closing element 60 of the previous embodiment. Namely, the seal closing element 90 comprises an annular base 91 and an insertion wall 92 extending from the annular base 91. The insertion wall 92 is configured to be inserted into the gland channel 20 at the first gland opening 21. The annular base 91 and the insertion wall 92 define a seal closing element channel configured to receive at least one optical cable 2. Specifically, the first gland portion 15 is configured to be coupled with the seal closing element 90. In detail, the first gland portion 15 and the seal closing element 90 have the same cross section shape, namely petal cross section for the present embodiment, so as the seal closing element 90 can be inserted into the gland channel 20 at first gland portion 15. According to the alternative embodiment, the first gland portion 15 and the seal closing element 90 have a polygonal, circular or circular sector cross section.

In details, the first seal portion 44 and the first gland portion 15 define therebetween an insertion groove configured to receive by interference fit the seal closing element 90, in particular the insertion wall 92.

Accordingly, the outer seal surface 41 at the second seal portion 45 is configured to engage by interference fit the inner surface of second portion 16 of the gland channel 20. The outer seal surface 41 at the first seal portion 44 is configured to engage by interference fit with an inner surface of the seal closing element 90, namely the inner surface of the seal closing element.

According to the present embodiment, the gland body 20 comprises a seal locking arrangement 150 configured to mutually and reversibly lock the seal closing element 90 to the gland body 10 at a gland channel 20 along the insertion direction X-X.

The seal locking arrangement 150 comprises first seal locking elements 151 associated to the first gland portion 150 proximate to a first gland opening 21 of a relative gland channel 20. The seal locking arrangement 150 further comprises second seal locking elements 152 and a third seal locking element 153 associated to the seal closing elements 90.

The second seal locking element 152 and the third seal locking element 153 are configured to cooperate with the first seal locking elements 151 to lock the seal closing element 90 with respect the gland body 50 along the insertion direction X-X.

According to one embodiment, the first seal locking elements 151 comprise seal seats 151a. The seal seats 151a are formed on the first gland portion 15 of the gland channels 20 of the gland body 10. The second seal locking elements 152 comprise deformable adapter protrusions 152a configured to engage and fit in the seal seats 151a upon insertion of the seal closing element 90 into a gland channel 20. Namely, each deformable seal protrusion 152a, formed on the insertion portion 92 and protruding from the relative outer surface, is elastically deformable along a direction transversal to the insertion direction X-X for engaging the relative seal seat 151a. In detail, during the insertion of the seal closing element 90 into the gland channel 20, each deformable seal protrusion 152a deforms inwardly towards the centre of the channel, and upon reached the relative seal seat 151a deforms outwardly engaging the seal seat 151a.

It is to be noted that the first seal locking elements 151 and the second seal locking elements 152 are spaced apart respectively on the first gland portion 15 and the insertion wall 92. The first seal locking elements 151 and the second seal locking elements 152 can be formed on the centre of a relative side of the first gland portion 15 and the insertion wall 92.

In detail, the first seal locking elements 151 and the second seal locking element 152 defines a snap-fit engagement.

Finally, the third seal locking element 153 comprises a seal protrusion 153a configured to abut against the gland body 10 at the first gland opening 21 upon engagement between the first seal locking elements 151 and the second seal locking element 152. The seal protrusion 153a projects outwardly from the base 91 of the seal closing element 90 with respect to the seal closing element channel in the form of a flange.

In other words, the first adapter portion 55 is integrated in the gland body 10 defining the first gland portion 15 of the gland channels 20.

It is to be noted that all other technical features of the embodiment shown in FIGS. 13 and 14 are the same for the embodiment shown in FIGS. 1-12.

It is further object of the present invention, a multi-port gland assembly 200 shown in FIG. 5.

The multi-port gland assembly 200 comprises an optical closure 100 comprising a base 101 having one or more insertion channels 102 extending along an insertion direction X-X between first insertion openings 103 and second insertion openings 104. It is to be noted that, each insertion channel 102 comprises at the second insertion opening 104 an engaging edge 105 configured to engage a portion of the gland body 10. Furthermore, each insertion channel 102 has an inner surface 102a configured to engage with a multi-port gland 1.

The multi-port gland assembly 200 comprises one or more multi-port glands 1. The multi-port glands 1 are arranged in a respective insertion channel 102. In the following paragraphs, it is detailed one of the possible engagement arrangements between the gland body 10, specifically the outer gland surface 13, and one of the insertion channels 102.

The multi-port gland assembly 200 further comprises one or more optical cables 2 associated to the adapters 30 arranged into the gland channels 20 of the multi-port glands 1.

According to one embodiment, the multi-port gland assembly 200 comprises an anti-rotation arrangement 120 configured to prevent mutual rotation about a longitudinal axis A-A extending along the insertion direction X-X of the gland body 10 relative to the optical closure 100.

The anti-rotation arrangement 120 comprises first anti-rotation elements 121 associated to the gland body 10 and second anti-rotation elements 122 associated to the insertion channels 102 proximate to the first insertion openings 103.

The first anti-rotation elements 121 comprise protruding pins 121a formed on the outer gland surface 13 of each gland body 10. The first anti-rotation elements 121 can be formed proximate to the first gland end portion 11a.

The second anti-rotation elements 122 comprise slots 122a formed on the inner surface 102a of each insertion channel 102 and configured to receive and retain the protruding pins 121a upon insertion of the gland body 10 into the insertion channel 102 thereby preventing mutual rotation of the gland body 10 relative to the insertion channel 102 about the longitudinal axis A-A. The second anti-rotation elements 122 can be formed proximate to the first insertion opening 103 engaging the first anti-rotation elements 121 upon insertion of the gland body 10 into the insertion channel 102.

According to one embodiment, the multi-port gland assembly 200 comprises an axial locking arrangement 130 to prevent mutual motion along the longitudinal axis A-A relative to the optical closure 100.

Specifically, the axial locking arrangement 130 comprises a first axial locking elements 131 associated to the gland body 10 and a second axial locking elements 132 associated to the insertion channel 102 proximate to the second insertion opening 104.

The first axial locking elements 131 comprise elastic deformable wings 131a, formed on the outer surface of each gland body 20. The first axial locking elements 131 are formed on the outer gland surface 13 proximate to the second gland end portion 11b. Namely, each elastic deformable wing 131a, formed proximate to the second gland end portion on the outer gland surface 13 protruding from it, is elastically deformable along a direction transversal to the insertion direction X-X for engaging second axial locking elements 132. In detail, during the insertion of the gland body 10 into the insertion channel 102, each elastic deformable wing 131a deforms inwardly toward the centre of the channel, and upon reached second axial locking elements 132 deforms outwardly engaging the second axial locking elements 132.

The second axial locking elements 132 comprise seats 132a formed proximate to the second insertion opening 104 of each insertion channel 102 and configured to receive and retain the elastic deformable wings 131a upon insertion of the gland body 20 into the insertion channel 102, thereby preventing axial motion of the gland body 10 relative to the insertion channel 102 along the longitudinal axis A-A.

According to one embodiment, the gland body 10 has an extension along the insertion direction X-X greater than the extension of the insertion channel 102, so that a portion of gland body 10 extends beyond the second gland opening 22, as shown in FIG. 5, in this way, the first axial locking element 131 can engage the second axial locking element 132 at the second insertion openings 132.

In detail, the first anti-torsion elements 131 and the second anti-torsion elements 132 defines a snap-fit engagement.

It is to be noted that also in this case the first anti-torsion elements 131 are spaced apart along the outer gland surface 13 and the engaging edge 105 defines the second anti-torsion elements 132.

According to one embodiment, the gland body 10 comprises sealing grooves 14 formed on the outer gland surface between the first anti-torsion elements 131 and the second anti-torsion elements 133. The sealing grooves 14 are configured to receive an O-ring sealing element (not show) in order to improve the sealing of the insertion channel 102.

The invention claimed is:

1. A multi-port gland for an optical closure, the multi-port gland comprising:
 a gland body configured to be inserted in an opening formed on a base of an optical closure for passage of a plurality of optical cables, the gland body having gland channels extending along an insertion direction, each gland channel being configured for passage of one optical cable of the plurality of optical cables; the gland body comprising a lateral wall extending between a first gland end portion and second gland end portion along the insertion direction and an inner wall projecting from an inner gland surface of the lateral wall; the gland body having an outer gland surface configured to engage the optical closure; the inner wall and the lateral wall defining along the insertion direction the gland channels and relative first gland openings and second gland openings at the first gland end portion and the second gland end portion;
 wherein the multi-port gland comprises:
 one or more adapters, each adapter being configured to retain an optical cable of the plurality of optical cables, the optical cable passing through the relative first gland opening, each adapter being configured to be inserted at least partially into a gland channel, each adapter comprising:
  a seal body configured to seal the respective gland channel and to retain the optical cable passing through the gland channel;
  a seal closing element configured to cooperate with the seal body for sealing the gland channel and for retaining the optical cable passing through the gland channel.

2. The multi-port gland according to claim 1, wherein each seal body has an outer surface and comprises:
 a seal channel configured to receive the one optical cable of the plurality of cables;
  a slit extending from the outer surface to the seal channel and configured to guide insertion of the optical cable into the seal channel.

3. The multi-port gland according to claim 1, wherein each adapter further comprises:
 an adapter body having an adapter channel extending between a first adapter opening and a second adapter opening along the insertion direction and configured to receive the optical cable;
 wherein the seal closing element is coupled with the adapter body at the first adapter opening; and
 wherein the seal body is arranged into the adapter channel and is configured to cooperate with the seal closing element for sealing the adapter channel at the first adapter opening and for retaining the optical cable received in the adapter body.

4. The multi-port gland according to claim 3, wherein each adapter further comprises:
 an adapter locking arrangement configured to mutually and reversibly lock the adapter body and the seal closing element along the insertion direction.

5. The multi-port gland according to claim 4, wherein the adapter locking arrangement comprises:
 first adapter locking elements associated to the adapter body proximate to the first adapter opening;
 second adapter locking elements and a third adapter locking element associated to the seal closing elements and configured to cooperate with the first adapter locking elements to lock the seal closing element with respect the adapter body along the insertion direction.

6. The multi-port gland according to claim 5, wherein:
 the first adapter locking elements comprise adapter seats;
 the second adapter locking elements comprise deformable adapter protrusions configured to engage and fit in the adapter seats upon insertion of the seal closing element into the adapter channel;
 the third adapter locking element comprises an adapter protrusion configured to abut against the adapter body at the first adapter opening upon engagement between the first adapter locking elements and the second adapter locking element.

7. The multi-port gland according to claim 3, comprising a gland locking arrangement configured to mutually and reversibly lock each adapter to the respective gland channel along the insertion direction, each gland channel extending between a first gland opening and a second gland opening along the insertion direction.

8. The multi-port gland according to claim 7, wherein the gland locking arrangement comprises:
 first gland locking elements associated to the gland body proximate to the second gland opening;
 second gland locking elements and a third gland locking element associated to the adapter body and configured to cooperate with the first gland locking elements to lock each adapter body with respect the gland body along the insertion direction.

9. The multi-port gland according to claim 8, wherein:
 the first gland locking elements comprise gland seats;
 the second gland locking elements comprise deformable gland protrusions configured to engage the gland seats at the second gland opening upon insertion of the adapter into the gland channel;
 the third gland locking element comprises gland protrusion configured to abut against the gland body at the first gland opening upon engagement between the first gland locking elements and the second gland locking element.

10. The multi-port gland according to claim 3, wherein at least a portion of the adapter body is shaped as the respective gland channel.

11. The multi-port gland according to claim 2, wherein each seal body further comprises:
 a first seal portion and a second seal portion extending from the first seal portion along the insertion direction and defining with the first seal portion the seal channel,
 the second seal portion being configured to be inserted into the gland channel and engaging an inner surface of the gland channel by interference fit;
 the first seal portion abutting against the gland body upon insertion of the second seal portion into the gland channel.

12. The multi-port gland according to claim 11, wherein the seal closing element is coupled with the first seal portion, the seal closing element being configured to cooperate with the gland body for sealing the gland channel and for retaining the optical cable received in the gland channel.

13. A multi-port gland assembly comprising:
an optical closure comprising a base having one or more insertion channels extending along an insertion direction between first insertion openings and second insertion openings;
one or more multi-port glands, each multi-port gland being arranged in a respective insertion channel, each multi-port gland comprising:
a gland body inserted in an opening formed on a base of an optical closure for passage of a plurality of optical cables, the gland body comprises a lateral wall extending between a first gland end portion and second gland end portion along the insertion direction and an inner wall projecting from an inner gland surface of the lateral wall; the gland body having an outer gland surface configured to engage the optical closure; the inner wall and the lateral wall defining along the insertion direction the gland channels and relative first gland openings and second gland openings at the first gland end portion and the second gland end portion;
wherein the multi-port gland comprises:
one or more adapters, each adapter being configured to retain the optical cable of the plurality of optical cables, the optical cable passing through the relative first gland opening, each adapter being inserted at least partially into a gland channel, each adapter comprising:
a seal body configured to seal the respective gland channel and to retain the optical cable passing through the gland channel;
a seal closing element configured to cooperate with the seal body for sealing the gland channel and for retaining the optical cable passing through the gland channel;
one or more optical cables associated to the adapters arranged into the gland channels of the multi-port glands.

14. The multi-port gland assembly according to claim 13, further comprising
an anti-rotation arrangement configured to prevent mutual rotation about a longitudinal axis extending along the insertion direction of the gland body relative to the optical closure;
an axial locking arrangement to prevent mutual motion along the longitudinal axis of relative to the optical closure.

15. The multi-port gland assembly according to claim 14, wherein the anti-rotation arrangement comprises:
first anti-rotation elements associated to the gland body;
second anti-rotation elements associated to the insertion channels proximate to the first insertion openings.

16. A multi-port gland assembly comprising:
an optical closure comprising a base having one or more insertion channels extending along an insertion direction between first insertion openings and second insertion openings;
one or more multi-port glands, each multi-port gland being arranged in a respective insertion channel, each multi-port gland comprising:
a gland body inserted in an opening formed on a base of an optical closure for passage of a plurality of optical cables, the gland body comprises a lateral wall extending between a first gland end portion and second gland end portion along the insertion direction and an inner wall projecting from an inner gland surface of the lateral wall; the gland body having an outer gland surface configured to engage the optical closure; the inner wall and the lateral wall defining along the insertion direction the gland channels and relative first gland openings and second gland openings at the first gland end portion and the second gland end portion; the gland body has an extension along the insertion direction greater than the extension of the insertion channel so that a portion of gland body extends beyond the second gland opening, thereby the first axial locking element being configured to engage the second axial locking element at the second insertion openings;
wherein the multi-port gland comprises:
one or more adapters, each adapter being configured to retain the optical cable of the plurality of optical cables, the optical cable passing through the relative first gland opening, each adapter being inserted at least partially into a gland channel, each adapter comprising:
a seal body configured to seal the respective gland channel and to retain the optical cable passing through the gland channel;
a seal closing element configured to cooperate with the seal body for sealing the gland channel and for retaining the optical cable passing through the gland channel;
one or more optical cables associated to the adapters arranged into the gland channels of the multi-port glands.

* * * * *